United States Patent [19]

Harsch et al.

[11] Patent Number: 4,875,176
[45] Date of Patent: Oct. 17, 1989

[54] METHOD AND APPARATUS FOR MEASURING SURFACE TEMPERATURES

[75] Inventors: Curtis L. Harsch, 13309 Pennypacker La., Fairfax, Va. 22033; Kerry B. Beach, Herndon, Va.

[73] Assignee: Curtis L. Harsch, Centreville, Va.

[21] Appl. No.: 111,753

[22] Filed: Oct. 22, 1987

[51] Int. Cl.⁴ .............................................. G01K 1/02
[52] U.S. Cl. ..................................... 364/557; 374/186; 374/170
[58] Field of Search ...................... 374/170, 186, 137; 364/557, 550, 473

[56] References Cited

U.S. PATENT DOCUMENTS

| | | | |
|---|---|---|---|
| 3,854,336 | 12/1974 | Bibby | 73/146 |
| 3,961,657 | 6/1976 | Chrobak | 152/523 |
| 4,115,785 | 9/1978 | Hoopes et al. | 374/186 |
| 4,254,338 | 3/1981 | Abel et al. | 364/557 |
| 4,371,483 | 2/1983 | Mattson | 364/473 |
| 4,409,662 | 11/1983 | Rao | 364/557 |
| 4,447,884 | 5/1984 | Wada | 364/557 |
| 4,463,437 | 7/1984 | Schenck et al. | 364/557 |
| 4,469,450 | 9/1984 | DiVincenzo | 374/119 |
| 4,475,158 | 10/1984 | Elias | 364/413 |
| 4,602,872 | 7/1986 | Emery et al. | 374/152 |
| 4,636,093 | 1/1987 | Nagasaka et al. | 374/186 |
| 4,700,972 | 10/1987 | Young | 280/707 |
| 4,734,871 | 3/1988 | Tsunoda et al. | 364/557 |
| 4,737,917 | 4/1988 | Perron | 364/473 |

Primary Examiner—Parshotam S. Lall
Assistant Examiner—S. A. Melnick
Attorney, Agent, or Firm—Kenyon & Knyon

[57] ABSTRACT

The disclosure relates to an electronic system which includes a microcomputer circuit with a stored program, data storage means, a keyboard, and a display cooperating with a temperature probe assembly to display the temperature along a given path. The apparatus include means for connecting the apparatus to a power source exterior of the apparatus or a battery source so as to be completely portable in operation. The microcomputer, along with various commands in the keyboard input, cooperate with the data storage means to display the temperature in digital or graphical representation and also to provide a recall feature so that prior temperature profiles can be recalled for comparison purposes.

12 Claims, 1 Drawing Sheet

METHOD AND APPARATUS FOR MEASURING SURFACE TEMPERATURES

BACKGROUND AND DISCUSSION OF THE INVENTION

There are a number of various types of temperature-sensing devices in the marketplace which are, for their particular use, reasonably accurate and acceptable. However, it has been found that existing thermometers, or other temperature sensing devices, are inadequate for measuring temperatures along the surface in a sufficiently short period of time before the surface cools in order to otherwise display or sense accurately a profile of the entire surface temperature.

An example of problems with certain temperature measuring instruments is with those used in conjunction with race cars. During the course of a race, it is often necessary to measure the temperature of the tires to insure that the right tires are being used and that they are utilized at the correct pressure among other possible parameters. These parameters are used to enhance the operation of the individual car during the course of a race and to avoid damage to the tire.

When the race car pulls off the track, the tires cool rapidly. Those temperature sensing devices utilizing single probe members and recording only a single temperature, cannot be actuated in a manner which will permit determination of the profile across the entire tire. As a result, by the time the operator takes individual temperature readings at various portions of the tire, the tire has sufficiently cooled so that an accurate tire profile cannot be acheived. Rather, what will be shown is a change in temperature due to the cooling mechanism rather than other parameters of tire pressure, size, weight, speed, etc.

The invention herein has overcome many of the deficiencies in measuring temperatures of surfaces which can change rapidly where the temperature surface profile is desired. In the invention described herein, an electronic apparatus is utilized with a temperature sensing means to measure the temperature across the entire width of a desired surface and specifically that of a tire. For this purpose, the temperature sensing means is connected to a sensor interface for converting the analog temperature sensed into a digital output that can be used by the remainder of the apparatus.

A microprocessor, having read only memory for storage of a program operates a system in conjunction with memory or data storage means and a display to retrieve data from the memory and display it in either graphical or digital form for readout by the operator. A keyboard having the desired command keys is integrated with the other elements of the system discussed above to command the system to make the measurements, recall previous measurements and display specific measurements and profiles. In addition, various other keys can be incorporated to perform certain arithmetical and other functions to compare current and previous measurement profiles. Since it is often desirable to compare a current profile with that of one taken some time before, the apparatus includes a means for storing previous profiles and recalling them for comparison with more recent temperature readings. For this purpose, a number of different types of sensors can be used such as thermistors, semiconductor temperature sensors, resistance temperature detectors, thermocouples, or non-contact infrared temperature sensors. The sensor utilized must be one which has a rise time to the maximum reading of less than 2 seconds and has a temperature range preferably between 0° C. to 150° C.

Tha above has been a brief description of the deficiencies of the prior art and the advantages of the invention described herein. Other advantages can be perceived from the detailed discussion of the preferred embodiment which follow.

DETAILED DESCRIPTION OF THE PREFERRED EMBODIMENT

Figure 1:
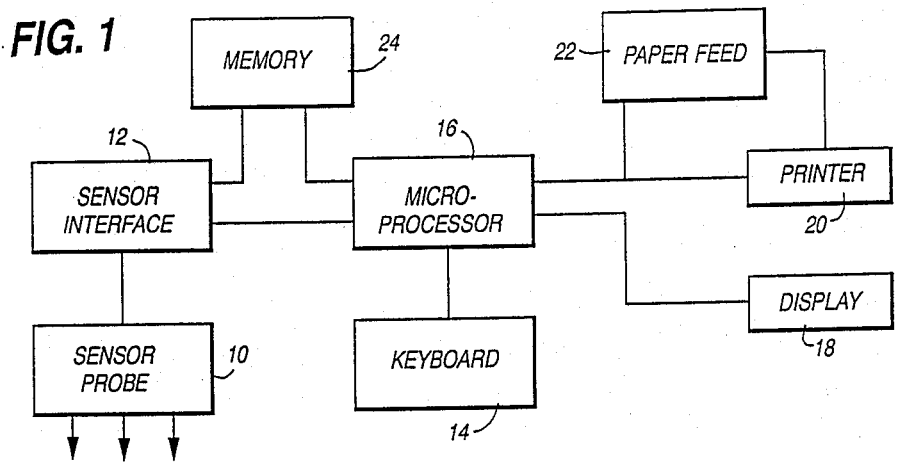
FIG. 1 is a schematic diagram of the various elements of the invention.
Figure 2:
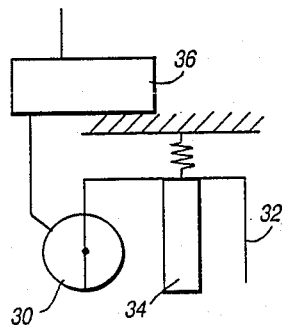
FIG. 2 is a schematic of an embodiment of the probe of the invention with a movable probe assembly.

As can be seen in FIG. 1, the apparatus includes a sensor probe 10 for sensing the temperature profile of a surface. This can be accomplished by a multiple or series of mechanically operated probes or a single probe in conjunction with a encoding mechanism. Sensor probe 10 is connected to interface circuit 12 for converting the analog measurements of the sensor probe into a digital output which can be utilized by the remainder of the apparatus. A memory 24 is connected to the interface. A microprocessor 16 connects the interface circuit 12, display 18, and the keyboard 14. In this manner, by operation of the keyboard, various commands can be input into the microprocessor to measure and display the desired parameters. In addition, a printer 20 can be incorporated with the microprocessor and a paper feed 22 to permanently record the desired information shown on the display.

The microprocessor 16 in this particular embodiment has a read-only memory for storage of a program which operates the system, a read-write memory for temporary data storage for utilizing the display or some other element of the apparatus, and input/output circuits for interface to the other circuit blocks as shown in the Figure.

A feature of the invention as discussed above is the ability to store certain data and recall it for use for comparison purposes. For this purpose, a memory 24 is integrated between the microprocessor 16 and the interface circuit 12. The memory 24 is a nonvolatile data storage device utilizing read-write memory which retains its values for a period of time, even if power to reset the electronics assembly has been turned off. This is accomplished with conventional CMOS, RAM and battery power, or with the EAROM, EEPROM, NOV-RAM integrated circuits.

The memory 24 is connected to the interface circuit 12 which provides the analog to digital conversion to generate a signal which can be utilized by the remainder of the apparatus. Depending on the type of sensor utilized, the interface may include a sensor specific power supply and signal conditioning circuits to convert the signals into the digital output which can be utilized by the memory in the microprocessor. Where multiple sensors are used, multiplexing circuits are integrated to allow the microprocessor to access each individual sensor, if necessary.

Printer 20 is connected to a paper feed 22 which is actuated by the microprocessor 16 upon the appropriate command from the keyboard 14. The printer mechanism can include dot matrix impact, pen plotter, or dot matrix non-impact, thermal, ink jet, etc. Printer 20 and paper feed 22 are integrated with microprocessor 16 to print on paper from feed the same information shown on display. In this manner, a permanent record can be made.

Figure 3:
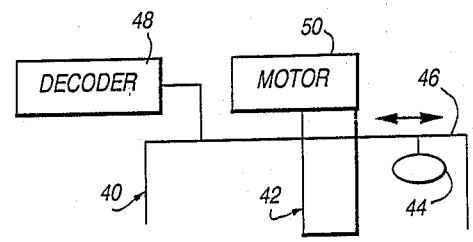
FIG. 3 is a schematic of an embodiment of the probe of the invention with an adjustable track.

The sensor probe assembly 10 can include a number of different embodiments. Where a single probe sensor is utilized, the apparatus includes a means for determining the position of the sensor along the path on the surface on which the temperature is being measured. A wheel 30 may be integrated with an enclosure 32 for the sensor 34 to generate the information concerning the position of the sensor relative to the surface. A encoder 36 coverts the rotation of the wheel to a digital output which can be utilized by the microprocessor 16 and other elements of the invention to produce various temperature measurements corresponding to the distance of travel of the device along the path.

Where the surface to be measured is generally fixed in dimension, different configurations for the sensor probe can be utilized. For example, in FIG. 3 where track mechanism 40 is employed to define the probe path, the track 46 is adjustable by key 44 to the surface and sensor 42 is moved along the track which constrains the sensor movement to a straight line. Decoder 48 is integrated with the microprocessor 16 to read the sensor readout at specific points along the track. For this purpose, a motor 50 can be utilized to move sensor 42 at the desired rate to insure that the temperature profile is measured at a time equal to or greater than the minimum capable of being measured by the electronic system.

Figure 4:
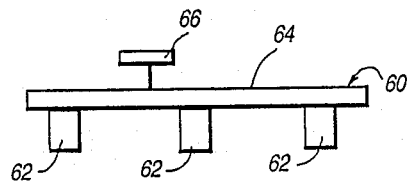
FIG. 4 is a schematic of an embodiment of the probe invention with multiple probes.
Figure 5:
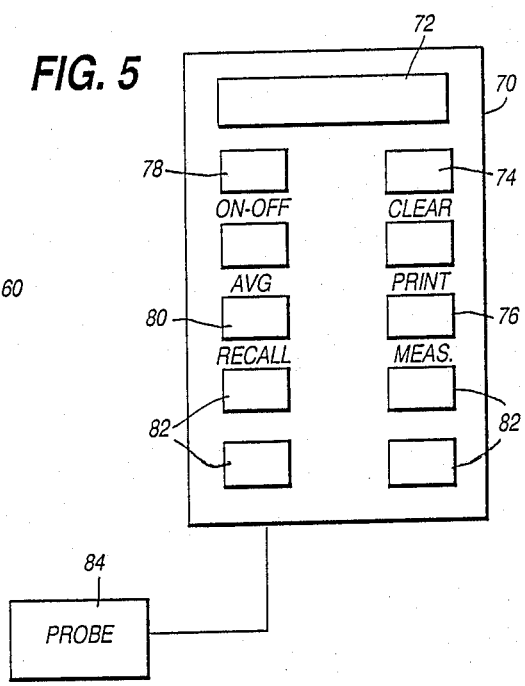
FIG. 5 is a schematic of the housing for the invention with command keyboard and display.

In another embodiment of the invention, as shown in FIG. 4, a multiple probe system is utilized. Multiple sensors 62 are permanently fixed at equal spaces along the support rail 64. Provisions can be made for either manual or automatic adjustment 66 of the spacing to accommodate a particular surface to be measured.

In operation of the system as shown above, the system is initiated by a command key which turns the system on after connection to the power source. Before making the measurement, the operator can review previous measurements by actuating the recall key 80. Prior measurements which have been made will be extracted from the memory 24 by the microprocessor 16 and the display 18 will display the appropriate parameters in digital or graphical form. Where a new measurement is made, the operator will press the appropriate measurement key and the microprocessor 16 will assign a name for the measurement to be taken for the purposes of recall.

The operator then positions the probe assembly over the surface to be measured and presses the key corresponding to the "measure" command. The microprocessor 16 will scan the sensor and the signal from the position encoding mechanism on the probe assembly rail, and in the case of a motor-driven probe assembly, then turn on the motor 50. In the case of a manually operated probe assembly, the operator will proceed to move the sensor by hand. In any event, at each desired measurement, as the point indicated by a signal from the position encoding means, the value of the temperature at that point as represented by the sensor output signal which will be stored in the memory 24. When the temperature values for all the points have been stored, the microprocessor 16 automatically displays the stored values and a graphical representation of their relationship which is the temperature profile of the surface.

The operator, by actuating the appropriate command key, can cause the microprocessor 16 to display other previous profiles for comparison. By actuating another command key, the microprocessor 16 can calculate and display the differences between the profiles or otherwise analyze time trends for a number of profiles stored in the memory 24. Stored profiles may be measurements taken at different times along different lines on the same surface or profiles from different surfaces.

Where a multiple sensor system is used, in this case three sensor space generally equally along the sensor assembly, the encoding system, as discussed above, in conjunction with movable assemblies is not required. Rather, at the interface 12, all that is required is a conversion from each individual sensor 62 over a particular time to the digital output corresponding to the temperature measure. This digital output is then directed to storage where it can be utilized by the microprocessor 16, depending on the commands from the keyboard. With this system, upon actuation of the measured command, the microprocessor 16 can read the values of the sensor directly. This system has the advantage of reliability and speed of operation when compared to the single probe systems discussed above.

Where the operator desired to maintain a record of the temperatures being sensed, the printer system can be actuated by the appropriate key on the keyboard. The system would operate in the manner described above. However, in addition to the display, the printer 20 will print and the paper feed 22 will be actuated to show the corresponding digital and graphical representation that are shown on the display 18.

What is claimed is:

1. An apparatus for measuring temperature across the surface of a tire comprising:
   (a) three temperature sensors for sensing temperature of material along the surfaces simultaneously at three spaced locations;
   (b) adjustable means for adjusting the location of each sensor;
   (c) an interface means for converting analog temperature measurements of said sensing means to a digital output;
   (d) a display for displaying simultaneously three separate representations of the temperatures sensed;
   (e) a microprocessor;
   (f) an operator keyboard for inputting commands into said microcomputer;
   (g) memory means for storing data from said interface means corresponding to the digital output thereof;
   (h) means for connecting said sensors, said microprocessor, said keyboard, and said memory means to a power source; and
   (i) said microprocessor cooperating with said interface means, said display, said power source, and said keyboard to display a representation corresponding to the temperatures sensed.

2. The apparatus according to claim 1 wherein said microprocessor, said memory means and said display cooperating to display the temperature sensed in a digital representation.

3. The apparatus according to claim 1 wherein said source is a battery permitting said apparatus to be utilized portably.

4. The apparatus according to claims 1 further comprising a source of paper, and means for printing on said paper the sensed temperature in the form of digital output or graphical profile.

5. The apparatus according to claim 1 wherein said sensing means includes thermistor temperature sensors.

6. The apparatus according to claim 1 wherein said sensing means includes semiconductor temperature sensors.

7. The apparatus according to claim 1 wherein said sensing means includes resistance temperature detectors.

8. The apparatus according to claim 1 wherein said sensors include thermocouple temperature sensors.

9. The apparatus according to claim 1 wherein said sensing means includes non-contact infrared temperature sensors.

10. An apparatus for measuring temperature comprising:
 (a) a sensing means for sensing temperature of material along the surfaces thereof;
 (b) an interface means for converting analog temperature measurements of said sensing means to a digital output;
 (c) a display for displaying representations of the temperature sensed;
 (d) a microprocessor;
 (e) an operator keyboard for inputting commands into said microcomputer;
 (f) memory means for storing data from said interface means corresponding to the digital output thereof;
 (g) means for connecting said sensing means, said microprocessor, said keyboard, and said memory means to a power source;
 (h) said microprocessor cooperating with said interface means, said display, said power source, and said keyboard to display a representation corresponding to the temperature sensed;
 (i) a source of paper, and means for printing on said paper the sensed temperature in the form of a digital output or graphical profile; and
 (j) said means for sensing the temperature including a single temperature sensor probe, and enclosure at least partially enclosing said sensor probe, said enclosure being movable along the path of surface to be measured by the operator, said enclosure incorporating an encoding means for indicating the position along the path.

11. The apparatus according to claim 10 further comprising means for constraining movement of said sensor to a straight line, and said encoding means cooperating with said sensor probe to indicate the position of the sensor along the line.

12. The apparatus according to claim 11 further comprising a motor means for moving said sensor along said line.

* * * * *